Aug. 27, 1968  MICHIO AMBE  3,399,322

CARBON ROD ASSEMBLIES FOR ARC GOUGING OF STEEL

Filed Oct. 21, 1965

INVENTOR.
MICHIO AMBE
BY
Kane, Dalsimer, Kane + Smith
ATTORNEYS

United States Patent Office

3,399,322
Patented Aug. 27, 1968

3,399,322
CARBON ROD ASSEMBLIES FOR ARC
GOUGING OF STEEL
Michio Ambe, Kaizu-gun, Gifu-ken, Japan, assignor to
Ibigawa Electric Industry Co., Ltd., Ogaki-shi, Gifu-
ken, Japan, a corporation of Japan
Filed Oct. 21, 1965, Ser. No. 499,884
Claims priority, application Japan, Aug. 30, 1965,
40/70,759
5 Claims. (Cl. 313—357)

ABSTRACT OF THE DISCLOSURE

A carbon rod assembly is provided in which the individual rods include a substantially cylindrical socket at one end and an axial projection at the other end. An uninterrupted copper coating is present on the exterior of each rod including the inner wall of the socket and outer surface of the projection. The projection is provided with an axial slot to impart resiliency thereto. The length of the projection is smaller than the socket is deep; and its outer diameter slightly larger than the inner diameter of the socket. The individual rods are thusly adapted to be joined by inserting the projection of one rod into the socket of another rod and secured firmly by the resiliency of the projection.

---

This invention relates to a carbon rod assembly which is useful as an electrode for gouging or blasting of steel acticles or as an electrode for carbon arc lamps.

The carbon electrode which has been widely used for these purposes comprises a copper plated single piece of carbon rod having a diameter of from ¼ to one inch and a length of approximately one foot. As is well recognized by those skilled in the art, when a strong electric current is passed through such a rod shaped carbon electrode, the current has a tendency to flow essentially through the surface layer of the electrode. The copper coating is provided for the purpose of reducing electric resistance of the surface layer whereby to improve its current carrying capacity, and to prevent the electrode from overheating. The copper plating also serves to prevent damage of the electrode during handling.

When using such a carbon electrode for gouging the surface of a steel article, the electrode is gripped by a suitable holder through which electric current is supplied to the electrode to strike an electric arc between the tip of the electrode and the surface of the steel article or workpiece to melt the surface metal, the molten metal being blown away by a high pressure air supplied by the holder. By successively moving the electrode with respect to the workpiece a definite thickness of the surface thereof is cut away. This technique is also valuable for blasting away the undesired projections of any casting.

In the use of such a rod shaped electrode it is essential to keep the arc sufficiently remote from the holder in order to prevent the holder from being subjected to serious damage caused by the high temperature of the arc. Accordingly, as the electrode is consumed the holder is gradually moved towards the upper end of the electrode until finally a short piece of the electrode must be discarded. This has resulted in a normal loss of from 25% to 30% of the material of the electrode.

If it were possible to successively connect a new electrode to the worn out electrode, it would be very economical because the short electrodes were not discarded. Large sized carbon electrodes for use in electric refining furnaces are provided with female and male screw threads at their opposite ends to that they may be coupled together by meshing these screw threads. However in electrodes of small diameter such as used in the gouging of steel articles or arc lamps for cinematograph for example, couplings of electrodes by means of screw threads are not practical from the standpoint of mechanical strength.

A method of successively coupling electrode pieces without utilizing screw threads is disclosed in U.S. Patent No. 3,030,544 dated Apr. 17, 1962. The carbon rod assembly disclosed therein comprises a first length of solid rod having a socket at its upper end with an annular end surface surrounding the socket, where said socket opens through the supper end face of the rod, and a second length of rod having a lower end face with an annular outer portion and a frusto-conical inner portion extending beyond the annular outer portion, the socket and the frusto-conical portion tapering to a smaller diameter and the lengths of the rod being secured together by permanent jamming of the frusto-conical portion in the socket. Both tapered contact surfaces of the frusto-conical portion and the socket are not plated by copper, and that is carbon-to-carbon contact. The reason for this is that the metal coatings reduce the friction between tapered contact surfaces. Thus the copper coating deposited on the outer surface of each length of the rod is absent at the coupling portion, and the large electric current flows through the coupling via said carbon-to-carbon contact.

With this carbon rod assembly, interfitting and intercoupling of both tapered surfaces are relatively easy. However, while the electrode assembly is used for gouging steel articles, it was noted frequently that the downside piece disengaged from the upperside piece. It is believed that this is caused by the thermal expansion of the socket heated by the electric arc, thus loosing the coupling. This is especially true when the downside piece is worn out to bring the arc closer to the coupling. Further, the inner edge of the socket and the projected part are liable to damage during usual handling or at the time of interfitting, and even a minute fragment that may accidentally reside between contact surfaces not only prevents snug fitting but also increases contact resistance. In addition, in the carbon-to-carbon contact the electric contact resistance is not only relatively high but also is not constant thus rendering the arc unstable. Also due to heat generated by this high contact resistance, the copper plating adjacent the coupling becomes melted thus causing larger current instability.

It is therefore an object of this invention to provide a novel carbon rod assembly by which the whole length of the electrode can be effectively utilized whereby the loss of material by discarding short length of the electrode is avoided.

Further object of this invention is to improve the electrode rod assembly of the type disclosed in the U.S. Patent No. 3,030,544 and to eliminate various difficulties thereof mentioned above.

A more specific object of the invention is to provide a novel construction suitable for joining a stub end of a carbon rod to the front end of new one. A joint of the necessary mechanical strength and of inexpensive construction is an obvious requirement, but the more exacting problem for the carbon rod involved is to attain said requirement with a joint that does not cause such increase in contact resistance as to cause disengagement and damage of the joint for small diameter rods when subjected to an extremely high current flow that is used with carbon rod electrode. Throughout the lengths of the interconnected rods there must not be any interruption of copper coating, and substantially all of the electric current must be transmitted through the copper coating.

The features of the invention which are believed to be novel are set forth with particularity in the appended claims. The invention itself, however, as to its organization together with further objects and advantages thereof, may best be understood by reference to the accompanying drawing in which:

Figure 1:
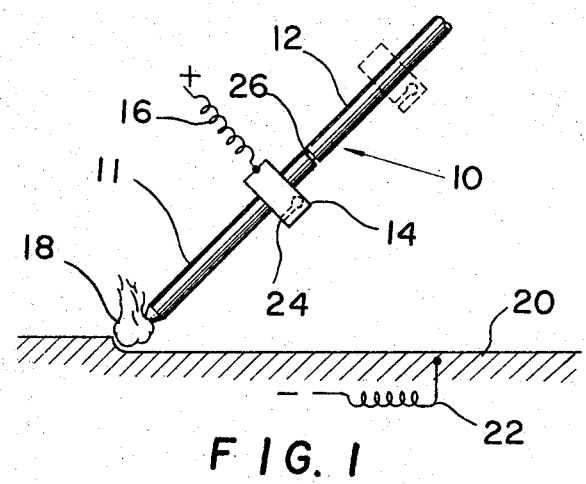
FIG. 1 shows a side elevation of a carbon rod assembly held by a holder for gouging the surface of a steel workpiece.

Referring now to FIG. 1 of the accompanying drawing, there is shown a carbon rod 10 for gouging the surface of a steel workpiece comprising a short stub piece 11 which has been partially consumed and a new piece of carbon rod 12 of a predetermined length which are suitably joined at 26. The carbon rod 10 is held by a holder to which electric current of high intensity is supplied through a conductor 16. The detailed construction of the holder 14 is not illustrated since such holder is well known in the art, so that it is sufficient to mention that the carbon rod 10 is frictionally gripped by the holder 14, and that the holder can be loosened and moved to any new gripping position convenient for the particular job as the rod is consumed or burned out by an electric arc 18 struck between the lower end of the rod and the surface of the steel workpiece 20. The workpiece 20 is connected to other side of a source of electric energy, not shown, by another conductor 22. The molten metal produced by the heat of electric arc 18 is blown away by compressed air issuing from an air outlet port 24 provided for the holder 14. Thus, by successively moving the arc along the surface of the workpiece, the surface layer thereof can be removed to a predetermined depth.

Figure 2:
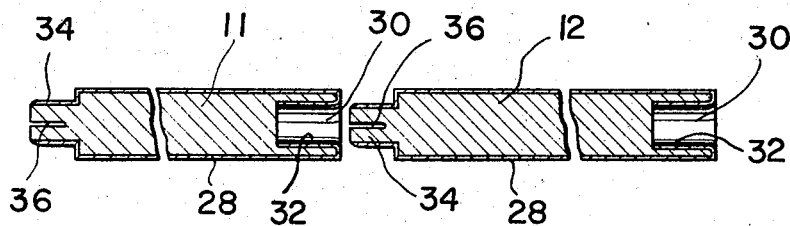
FIG. 2 shows a longitudinal sectional view of one form of a carbon rod assembly embodying this invention.

FIG. 2 shows a longitudinal section of a carbon rod assembly to illustrate a manner of joining together carbon rod pieces 11 and 12. As shown, a substantially cylindrical socket hole 30 is formed at one end surface of the rod piece 11. According to this invention a copper coating 28 is provided to cover not only the outer periphery of the rod piece but also around the annular end face, and also the inner wall of the socket hole 30 as a continuous layer. The bottom surface of the socket hole is not required to be plated because electric current is not conducted through this surface. While the thickness of the copper plating is shown exaggerated in the figure, actually it may be approximately 0.004 inch. The opposite end of the rod piece is provided with a substantially cylindrical axial projection 34 of reduced diameter. The perhipheral surface of this projection is coated with copper continuous to the copper plating 28 on the peripheral surface of the rod piece 11. The diameter of the projection is made slightly larger than the inner diameter of the socket hole 30, while the length of the projection 34 is made slightly smaller than the axial depth of the socket hole 30. An axial slot 36 is provided for the projection 34. If desired, the slot 36 may be cut to have a criss-cross configuration in order to provide more snug fitting. Further to assure easy fitting the annular end surface of the socket hole and the end corner of the projection 34 may be rounded as shown in the figure. The configuration and construction of the rod piece 12 are identical with those of the rod piece 11. To join together the rod pieces 11 and 12 it is only required to force the projection 34 of the rod piece 11 into the socket hole 30 of the rod piece 12. As mentioned above, since the diameter of the reduced end projction 34 is made slightly larger than the inner diameter of the socket hole 30, these parts are joined very snugly wtihout leaving any clearance therebetween. This snug fitting is assisted by the axial slot 36 which imparts resiliency to the projection, thus permitting slight shrinkage thereof. By this resiliency the projection is urged against the inner wall of the socket so that there is no fear of accidental disengagement of the joined piece during use.

It was confirmed by experiment that sufficiently large mechanical strength and electrical contact surface can be provided by proportioning the diameter of the projection to about ⅗ of that of the rod, and the length of the projection to about ⅘ of the diameter of the rod, as can be roughly noted from FIG. 2. As has been pointed hereinabove the depth of the socket hole is made slightly larger than the depth of the projection.

The carbon rod assembly of this invention is characterized by having an electric connection through copper-to-copper contact. The contact resistance of this contact is substantially zero so that no appreciable local heating at the contact surface results, nor does interruption of the large current flowing through the copper plating occur. Accordingly not only the electric arc can be made very stable but also there is no fear of looseness of the joint owing to local thermal expansion at the contact surfaces as in the joint according to said U.S. patent. Moreover, since the thermal expansion coefficient of copper is larger than that of carbon, the expansion of contacted copper increases the contact pressure according to the rise of temperature of those contact parts. When the joint is brought much closer to the arc so that its temperature exceeds about 2000° F., the copper-to-copper contact completely adhere with each other, and firm joint is maintained even after cooling.

Another characteristic feature of the carbon rod assembly constructed according to this invention is that substantially no tapered surface is used at the joint, i.e., substantially cylindrical surfaces are utilized which are easier to machine to accurate dimensions than tapered surfaces. Usually the labor necessary for forming the latter is about twice larger than that of the former. Further with tapered contact surfaces the presence of any small foreign substance between them interferes intimate contact thus nullifying the effect of tapered surfaces. On the contrary, with substantially cylindrical contact surfaces as in this invention any small foreign substance that may present on the inner side wall of the socket or on the outer periphery of the projection is pushed forwardly to clear the contact surfaces thus always assuring perfect and firm contact therebetween. The small clearance between the bottom surface of the socket hole and the tip of the projection serves to accommodate such foreign particles.

One may consider that the air entrapped in this clearance might interfere the insertion of the projection into the socket hole, but I have found that there is no such fear as a result of extensive experiment. This is because that the pressure created in said clearance due to compression at the time of insertion or due to thermal expansion of entrapped air tends to act to widen the axial slot provided through the projection thus increasing the contact pressure.

Still another feature of this invention lies in the provision of the axial slot for the end projection of carbon rod thereby imparting resiliency to the projection. The slot can be readily provided by machine working with a little labor.

Figure 3:
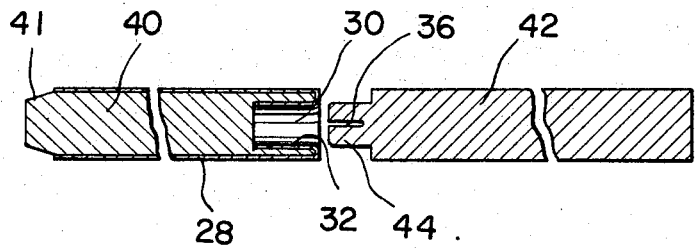
FIG. 3 shows a longitudinal sectional view of a modified embodiment of this invention.

FIG. 3 represents another embodiment of this invention. While in the embodiment shown in FIG. 2 new rod pieces are successively connected to worn out stub piece, in this embodiment the worn out stub piece is not connected to a new rod piece, but the stub piece is intended to be used as long as possible before it is discarded. Therefore in the case of FIG. 3, one end (or left hand end as viewed in FIG. 3) of a carbon rod piece 40 is not required to have a cylindrical projection of reduced diameter as the projection 34 in FIG. 2, but instead may have any desired configuration. The other end, however, is formed with a substantially cylindrical axial socket hole 30 having an inner wall 32 coated with copper in the same manner as in FIG. 2. The configuration of the other piece 42 to be joined with the rod piece 40 is identical with that of the piece 11 or 12 shown in FIG. 2 except that the socket hole is not provided. Since the purpose of the piece 42 is to merely hold the piece 40 in the operating position, it may all be made of any suitable common metal. The front end of this supporting piece 42 is provided with a substantially cylindrical axial projection 44 of reduced diameter and having an axial slot 36 to facilitate insertion of the projection in the socket hole 30. By successively moving the position of the holder towards the upper end of the rod assembly as has been described in connection with FIG. 1, it is able to use the rod assembly until the length of the carbon rod piece 40 decreases below 1 inch.

Thus by employing the supporting rod piece the loss or the percentage of the discarded portion of the electrode can be reduced to less than 10% from the prior value of 25% to 30%. When used carefully a single supporting rod piece may be used for more than 50 carbon electrode rod pieces. Further, the carbon rod piece 40 can be made more readily and at lower cost than the piece 11 shown in FIG. 2, because the former is not required to have the end projection. Although the rod assembly shown in FIG. 3 is preferable to be used in the working of steel articles, it is also suitable for use as electrodes of carbon arc lamps for cinematograph.

In accordance with the provisions of the patent statutes, I have explained the principle and operation of my invention and have illustrated and described what I consider to represent the representative embodiments thereof. However, I desire to have it understood that within the scope of the appended claims the invention may be practiced otherwise than as specially illustrated and described.

What is claimed is:
1. A carbon assembly for arc gouging of steel articles comprising
   a first piece of carbon rod piece having a substantially cylindrical socket hole at one end thereof and a coating of metal continuously covering the outer periphery and the inner wall of said socket hole,
   a second carbon rod piece having a substantially columnar axial projection of reduced diameter at one end thereof, having a metal coating covering continuously the outer periphery of said second rod piece and the outer periphery of said projection, and said columnar projection being provided with an axial slot to give resiliency thereto,
   the axial length of said projection being smaller than the axial depth of said socket hole, and the diameter of said columnar projection in free state being slightly larger than the inner diameter of said socket hole,
   and whereby said first and second rod pieces are adapted to be joined together by inserting said projection into said socket hole, and secured firmly by the resiliency of said projection.
2. The carbon rod assembly according to claim 1 wherein the diameter of said columnar projection is approximately ⅗ of the diameter of said second carbon rod piece.
3. The carbon rod assembly according to claim 1 wherein the axial length of said columnar projection is approximately ⅘ of the diameter of said second carbon rod.
4. A carbon rod piece for arc gouging of steel articles including
   a piece of carbon rod having a substantially cylindrical axial socket hole at one end thereof,
   having a columnar axial projection of reduced diameter at the opposite end provided with an axial slot to give resiliency thereto,
   a metal coating continuously covering the inner wall of said socket hole, the outer periphery of said carbon rod and the outer periphery of said columnar projection,
   and the diameter of said columnar projection being slightly larger than the inner diameter of said socket hole,
   whereby said carbon rod piece being adapted to be joined with another identical carbon rod piece by fitting the columnar projection of one rod piece in the socket hole of the other to establish a continuous path for electric current through metal coatings of said interconnected rod pieces and through the metal-to-metal contact between said interfitted columnar projection and socket hole.
5. A carbon rod assembly for arc gouging of steel and arc lighting of cinematograph comprising
   a first piece of carbon rod having a substantially cylindrical axial socket hole at one end thereof and a coating of metal continuously covering the outer periphery of said carbon rod and the inner wall of said socket hole,
   a second rod piece made wholly of metal having a substantially columnar projection of reduced diameter at one end thereof, said projection being provided with an axial slot to give resiliency thereto, the diameter of said columnar projection in free state being slightly larger than the inner diameter of said socket hole,
   and whereby said first and second rod pieces are adapted to be joined together by inserting said projection into said socket hole, and secured firmly by the resiliency of said projection.

References Cited
UNITED STATES PATENTS

| | | | |
|---|---|---|---|
| 2,120,243 | 6/1938 | Droll | 313—355 X |
| 2,298,686 | 10/1942 | Davis | 219—146 |
| 2,412,081 | 12/1946 | Droll | 313—354 X |
| 2,599,179 | 6/1952 | Hopkins | 313—355 X |
| 2,657,326 | 10/1953 | McCarty | 313—354 |
| 3,030,544 | 4/1962 | Zamboldi et al. | 313—355 |

JOHN W. HUCKERT, *Primary Examiner.*

A. J. JAMES, *Assistant Examiner.*